United States Patent [19]

Wilson

[11] Patent Number: 4,930,625
[45] Date of Patent: Jun. 5, 1990

[54] CONVEYOR BELT DUMPING MECHANISM USING HORIZONTAL IDLERS OF VARYING LENGTHS

[76] Inventor: William A. Wilson, 83 Pheasant Dr., Marietta, Ga. 30067

[21] Appl. No.: 375,938

[22] Filed: Jul. 6, 1989

[51] Int. Cl.⁵ .............................................. B65G 15/60
[52] U.S. Cl. ..................................... 198/839; 209/707
[58] Field of Search ...................... 198/839, 364, 598; 209/698, 707, 922, 923, 645

[56] References Cited

U.S. PATENT DOCUMENTS

| 97,070 | 11/1809 | Gardiner | 198/364 X |
| 4,461,378 | 7/1984 | Roth | 198/839 X |
| 4,541,532 | 9/1985 | Wilson | 198/598 X |

FOREIGN PATENT DOCUMENTS 1067725  10/1959  Fed. Rep. of Germany ...... 198/839

Primary Examiner—Robert J. Spar
Assistant Examiner—Cheryl L. Gastineau
Attorney, Agent, or Firm—Harry I. Leon

[57] ABSTRACT

An array of idlers supporting a conveyor belt except beneath a generally crescent-shaped section opening outwardly to one side thereof. The array includes idlers of various lengths and orientations. Each of the idlers is disposed perpendicularly to the centerline of the belt. Both upstream and downstream of the crescent-shaped section, pairs of idlers slope downwardly toward each other on either side of the belt centerline. Where the belt is supported by these pairs of idlers, it assumes a trough-like configuration. Proximate the cresent-shaped section, on the other hand, the idlers are unpaired and disposed horizontally. The shortest of these unpaired idlers is situated to one side of the cresent-shaped section at its greatest transverse width. On the other side but still within this section, the lip of the belt is virtually unsupported forming a soft spot. This soft spot is sized and situated so that any burden carried by the conveyor tends to remain on it unless a force is specifically applied to deflect objects within the burden laterally. When force is applied which causes a sufficiently large object to move transversely across the soft spot, the crescent-shaped section acts as a chute. In such instances, the belt lip sages downwardly, becoming the lowest part of the belt and allowing the deflected objects to slide easily off the belt. As a result, less force is required to push objects off the side of the conveyor than would otherwise be the case, and the life of the belt is extended.

6 Claims, 2 Drawing Sheets

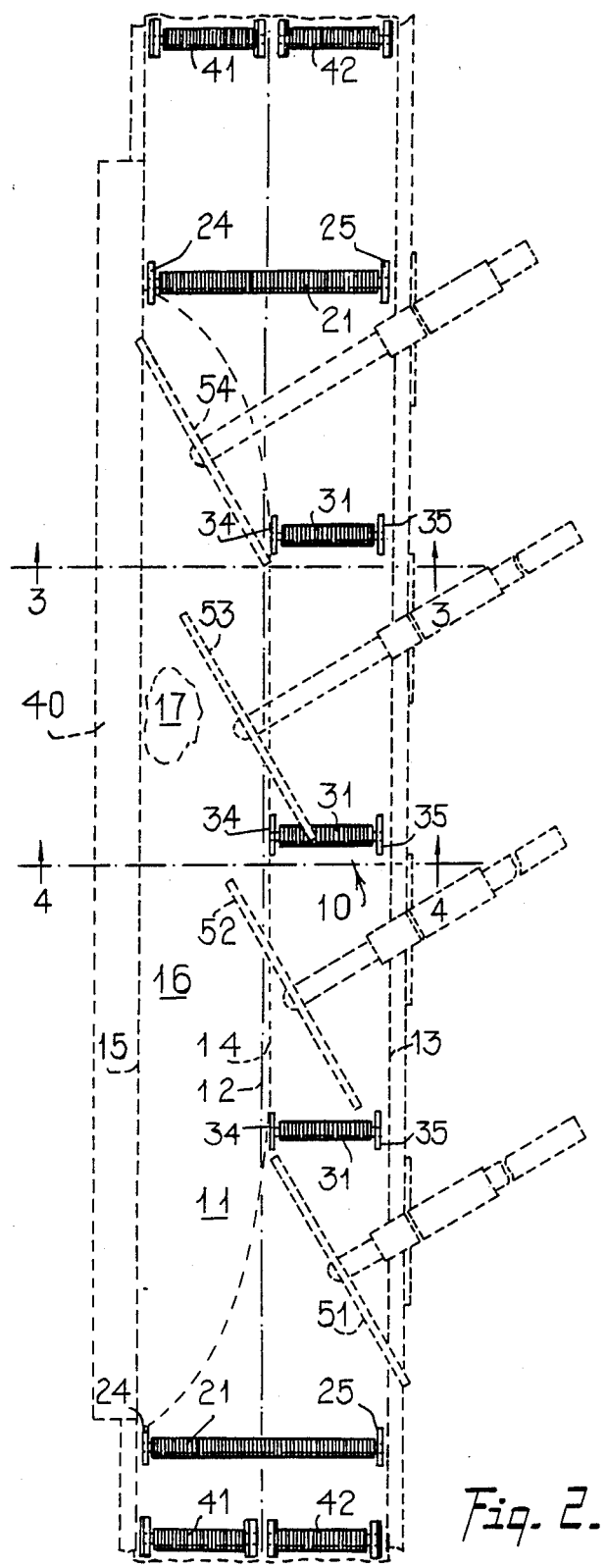

CONVEYOR BELT DUMPING MECHANISM USING HORIZONTAL IDLERS OF VARYING LENGTHS

BACKGROUND OF THE INVENTION

This invention relates to the removal of objects from a moving belt. Of particular interest are flat belts used for transporting raw material, especially mixtures in which both larger and smaller solids are present.

Prior to this invention a trough was formed in the belt by the use of idlers that were placed near the edges of the belt, with the outer end of each idler being disposed upwardly. With the idlers so positioned, the edges of the belt formed lips which prevented the material on the conveyor from falling off inadvertently. However, these lips hindered efforts to dislodge oversized objects from the moving belt. When devices were employed to deflect such objects sideways, for instance, the devices had to be capable of exerting a large side force just to move them past the raised belt lip. But forces of the magnitudes required tended to damage both the material and the belt itself.

SUMMARY OF THE INVENTION

The object of the present invention is to facilitate removing oversized objects traveling on a conveyor belt after these objects have been deflected sideways and dislodged from the main body of the burden carried by the conveyor. The dislodging impact may be imparted to such objects by one or more rakes rotatably mounted above the belt. In the preferred embodiment, side kick rakes described by Wilson in U.S. Pat. No. 4,541,532 are employed.

A further object of the present invention is to provide an apparatus which can be used in conjunction with a series of side kick rakes as described by Wilson to reduce the amount of force which otherwise needs to be applied by these rakes to remove large, heavy objects (such as a stone weighing a ton) from a conveyor belt.

According to the present invention, a short section of a moving conveyor belt is partially supported by an array of idlers placed perpendicular to the longitudinal axis of the belt. Each of the idlers is rotatably mounted in a horizontal position and is disposed parallel to and spaced apart from the other idlers. These idlers have varying lengths, the shortest idler being approximately one-half the length of the longest. The two longest idlers, each of which is approximately equal in length to the width of the belt, are disposed at the extreme ends of the array and centered on the belt. The shorter idlers are offset with respect to the belt centerline. In each of the shorter idlers, the end which is closest to this centerline lies in an arc with the general shape of a "C" which opens towards one edge of the belt. The overall placement of the idlers in the array is such that a crescent-shaped soft spot is provided in the moving conveyor belt. At any given instant, this soft spot is positioned between the two longest idlers.

When large objects in the burden on the conveyor are deflected onto the soft spot and toward the belt edge, the short section of the belt not only flattens but also sags. Thus the belt where it is partially supported by the array forms a chute which appears when needed reducing the amount of force which would otherwise be required to dislodge an oversized object from the belt.

BRIEF DESCRIPTION OF THE DRAWINGS

FIG. 2 is a plan view in which the placement of the idlers and of the belt according to the present invention is shown schematically, the belt and the rakes being shown in dashed lines;

DESCRIPTION OF THE PREFERRED EMBODIMENT

Figure 1:
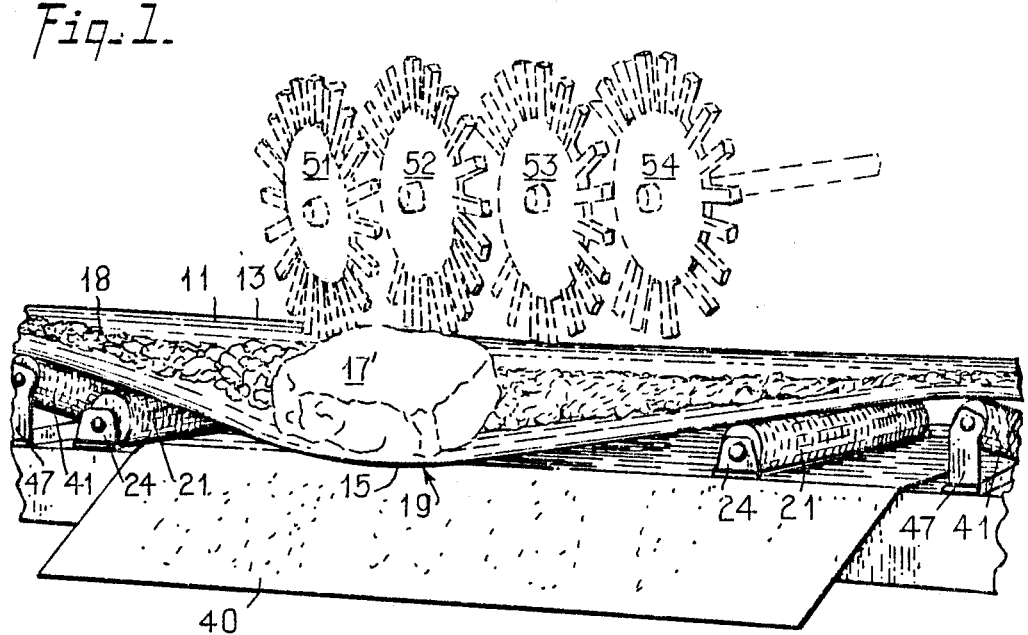
FIG. 1 is a perspective view of the apparatus according to the present invention, showing a fragmentary section of the conveyor belt; the rakes which are employed to deflect oversized objects sideways being shown in dashed lines.

Referring to FIGS. 1–4, an apparatus incorporating the present invention comprises an array 10 of rotatably mounted flat impact idlers 21, 31 over which a conveyor belt 11 travels. In most applications, the belt 11 travels at speeds between 350 feet and 1200 feet per minute. Each idler 21, 31 includes a roller 22, 32 on a shaft 23, 33 that turns in bearing blocks 24, 25; 34, 35 about an axis disposed perpendicularly to the belt centerline 12.

Figure 3:
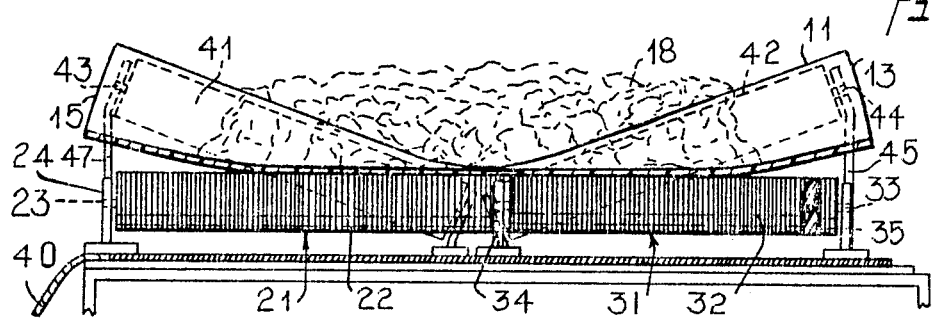
FIG. 3 is a side elevational view on an enlarged scale taken along the line III—III in which the position of the burden is shown in dashed lines.
Figure 4:
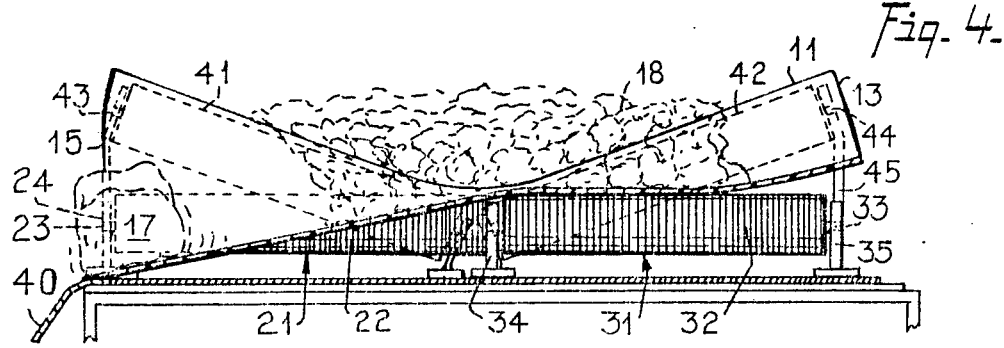
FIG. 4 is a side elevational view on an enlarged scale taken along the line IV—IV in which the position of the burden is shown in dashed lines, the view being taken when an oversize object is situated atop the soft spot on the belt.

As best seen in FIGS. 2–4, each of the idlers 21, 31 is unpaired and disposed horizontally. The length of each of the idlers 21 is approximately equal to the width of the belt 11 (FIG. 2). The length of each of the idlers 31, on the other hand, is substantially less than that of the idlers 21. The shorter idlers 31 are situated between the longest idlers 21 which are centered on the belt 11. In the shorter idlers 31, which are offset with respect to the belt centerline 12, one end of each idler lies along an imaginary arc 14 which opens towards an outer edge 15 of the belt 11. The overall placement of the idlers 21, 31 in the array 10 is such that a cresent-shaped soft spot 16 is formed. The soft spot 16 is disposed within the portion of the belt 11 lying directly above the arc 14 and within the edge 15 at any particular instant of time.

Both upstream and downstream of the array 10, pairs of idlers 41, 42 slope downwardly toward each other on either side of the belt centerline 12. A shaft 43, 44 within each of the idlers 41, 42 is rotatably mounted on bearing blocks 47, 45, respectively, and disposed at an angle to the horizontal which measures by way of example, 20 degrees (FIGS. 3 and 4). Supported by the paired idlers 41, 42, the belts 11 resembles a trough, the walls of which are useful in retaining the burden 18 on the conveyor. Passing over the array 10, with its horizontally disposed idlers 21, 31, the belt 11 flattens abruptly. But in situations in which all of the shorter idlers 21 are replaced by longer idlers 31, some lip remains along the edges 13, 15 of the belt 11, hindering the removal of oversized objects when they are forced over the sides of the belt.

The soft spot 16 is sized and situated so that any burden 18 carried by the conveyor tends to remain on it unless a force is specifically applied to deflect objects within the burden laterally. When a large, heavy object 17, 17' in the burden 18 carried by the conveyor is deflected onto the soft spot 16 and towards the belt edge 15, the belt 11 sags, forming a temporary chute 19. In order to help keep an object 17, 17' as it exits the chute 19 away from the conveyor, a fixed chute 40 is preferably attached to structure (not shown) beneath points where the chute 19 can form.

The apparatus according to the present invention can be used in conjunction with a series of side kick rake wheels 51, 52, 53, 54, with the wheels being employed to deflect oversized objects 17, 17' from the belt 11. The construction and operation of suitable rake wheels is disclosed by Wilson in U.S. Pat. No. 4,541,532. In the preferred embodiment illustrated in FIG. 2, the longest idlers 21 are positioned, by way of example, approximately 12 inches upstream of the leading edge of the first wheel 51 and approximately 12 inches downstream of the trailing edge of the last wheel 54. The space between these two longest idlers 21 is then divided into the same number of generally equal portions as there are rake wheels. Preferably, the furthest downstream shorter idler 31 is also placed close behind the leading edge of the furthest downstream wheel 54 to provide good support for the belt 11. A small overlap of the leading edge of the wheel 53 and the idler 31 is acceptable. In addition, the first paired set of idlers 41, 42 is mounted at a distance which measures no more than 4 feet downstream of the trailing edge of the wheel 54 and no more than 4 feet upstream of the point at which the axis of rotation of the wheel 51 lies directly above the edge 13 of the belt 11.

It is apparent from the foregoing that a new and improved apparatus for use in the removal of objects from moving belts has been provided. While only the presently preferred embodiment of the invention has been disclosed, as will be apparent to those familiar with the art, certain changes and modifications can be made without departing from the scope of the invention as defined by the following claims.

What is claimed:

1. An apparatus for partially supporting a conveyor belt comprising: a plurality of idlers, each of which is rotatably mounted in a horizontal position; at least two of the idlers being approximately equal in length to the width of the belt; the idlers being disposed approximately parallel to each other; idlers which are substantially shorter than said two idlers being disposed between them, each of the shorter idlers being offset with respect to the centerline of the belt and to the same side of the belt, the end of each of the shorter idlers which is closest to the centerline lying along an imaginary concave arc which opens towards one edge of the belt, thereby forming a soft spot in a portion of the belt passing to one side of the shorter idlers.

2. The apparatus according to claim 1 wherein the shortest idlers are further characterized as being at most one-half as long as the width of the belt.

3. A dumping mechanism for use with a conveyor belt supported in part by sets of paired idlers, the outer ends of the paired idlers being disposed upwardly of the inner ends thereof, so that the belt, when moving across the paired idlers, forms a trough, wherein the improvement comprises:

(a) an array of short horizontal idlers, each short horizontal idler having a length less than the width of the belt; each of the short horizontal idlers being offset with respect to the centerline of the belt and to the same side, the short horizontal idlers being positioned parallel to and spaced apart from each other; the ends of the short horizontal idlers nearest the centerline of the belt lying along an arc which has the general shape of a "C" which opens toward one edge of the belt; and (b) at least one pair of elongated horizontal idlers, each elongated horizontal idler having a length approximately equal to the width of the belt; the elongated horizontal idlers being disposed parallel to the short horizontal idlers; one of the elongated horizontal idlers being disposed upstream of the array and the other of the elongated horizontal idlers being disposed downstream of the array; each of the elongated horizontal idlers being disposed between the array and a set of paired idlers.

4. An apparatus for aiding in the removal objects from a moving conveyor belt comprising:

a plurality of approximately horizontal idlers for partially supporting a section of the belt, each idler being rotatable about an axis disposed perpendicularly to the centerline of the belt, at least one idler having a length substantially shorter than the width of the belt, the idlers being spaced apart from each other at regular intervals in the longitudinal direction of the belt, the idlers being offset with respect to the centerline of the belt and to the same side of the belt, such that a substantial portion of said section is virtually unsupported, said substantial portion of said section being at least twice as long as one of said regular intervals, the greatest transverse width of said substantial portion being generally equal to one-half the width of the belt.

5. The apparatus according to claim 4 which further comprises means for forming a temporary chute in the conveyor belt so that oversize objects can be easily slid off the belt, the chute forming means comprising the substantial portion of said section which is virtually unsupported.

6. The apparatus according to claim 5 wherein the outer edge of the belt bounding the substantial portion of said section which is virtually unsupported folds downwardly when a vertical load is applied to said bounding edge.

* * * * *